(12) United States Patent
Petkovic et al.

(10) Patent No.: US 6,185,527 B1
(45) Date of Patent: Feb. 6, 2001

(54) SYSTEM AND METHOD FOR AUTOMATIC AUDIO CONTENT ANALYSIS FOR WORD SPOTTING, INDEXING, CLASSIFICATION AND RETRIEVAL

(75) Inventors: Dragutin Petkovic, Saratoga; Dulce Beatriz Ponceleon, Palo Alto; Savitha Srinivasan, San Jose, all of CA (US)

(73) Assignee: International Business Machines Corporation, Armonk, NY (US)

( * ) Notice: Under 35 U.S.C. 154(b), the term of this patent shall be extended for 0 days.

(21) Appl. No.: 09/234,663

(22) Filed: Jan. 19, 1999

(51) Int. Cl.[7] ............................ G10L 15/08; G10L 11/02; G10L 15/04

(52) U.S. Cl. ...................... 704/231; 704/233; 704/251; 704/253; 704/270

(58) Field of Search ................................ 704/235, 251, 704/253, 257, 270, 231, 233

(56) References Cited

U.S. PATENT DOCUMENTS

| | | | |
|---|---|---|---|
| 5,199,077 | 3/1993 | Wilcox et al. | 381/43 |
| 5,293,584 | 3/1994 | Brown et al. | 395/2.86 |
| 5,404,510 | 4/1995 | Smith et al. | 395/600 |
| 5,436,653 | 7/1995 | Ellis et al. | 348/2 |
| 5,504,518 | 4/1996 | Ellis et al. | 348/2 |
| 5,526,407 | * 6/1996 | Russell et al. | 379/88.01 |
| 5,606,643 | * 2/1997 | Balasubramanian et al. | 704/243 |
| 5,612,729 | 3/1997 | Ellis et al. | 348/2 |
| 5,655,058 | * 8/1997 | Balasubramanian et al. | 704/255 |
| 5,712,953 | 1/1998 | Langs | 395/2.23 |
| 5,787,387 | 7/1998 | Aguilar | 704/208 |
| 5,937,422 | * 8/1999 | Nelson et al. | 707/531 |
| 6,100,882 | * 8/2000 | Sharman et al. | 345/320 |

FOREIGN PATENT DOCUMENTS

| | | | |
|---|---|---|---|
| 0 702 351 A2 | 3/1996 | (EP) | G10L/3/00 |
| 0 780 777 A1 | 6/1997 | (EP) | G06F/17/30 |
| 0 820 025 A1 | 1/1998 | (EP) | G06F/17/30 |
| 8063184 | 3/1996 | (JP) . | |
| 8087292 | 4/1996 | (JP) . | |
| 10049189 | 2/1998 | (JP) . | |

OTHER PUBLICATIONS

White Paper: "Retrieving Spoken Documents by Combining Multiple Index Sources." Jones et al. pp. 30–38. Computer Laboratory, Engineering Dept., Univ. of Cambridge, England. 1996.

(List continued on next page.)

*Primary Examiner*—Tālivaldis I. Šmits
(74) *Attorney, Agent, or Firm*—John L. Rogitz

(57) ABSTRACT

A system and method for indexing an audio stream for subsequent information retrieval and for skimming, gisting, and summarizing the audio stream includes using special audio prefiltering such that only relevant speech segments that are generated by a speech recognition engine are indexed. Specific indexing features are disclosed that improve the precision and recall of an information retrieval system used after indexing for word spotting. The invention includes rendering the audio stream into intervals, with each interval including one or more segments. For each segment of an interval it is determined whether the segment exhibits one or more predetermined audio features such as a particular range of zero crossing rates, a particular range of energy, and a particular range of spectral energy concentration. The audio features are heuristically determined to represent respective audio events including silence, music, speech, and speech on music. Also, it is determined whether a group of intervals matches a heuristically predefined meta pattern such as continuous uninterrupted speech, concluding ideas, hesitations and emphasis in speech, and so on, and the audio stream is then indexed based on the interval classification and meta pattern matching, with only relevant features being indexed to improve subsequent precision of information retrieval. Also, alternatives for longer terms generated by the speech recognition engine are indexed along with respective weights, to improve subsequent recall.

36 Claims, 9 Drawing Sheets

OTHER PUBLICATIONS

Article: "Content–Based Classification, Search, and Retrieval of Audio." Wold et al. Muscle Fish, IEEE Multimedia. vol. 3, No. 3. 16 pgs. Fall, 1996.

White Paper: "Automatic Audio Content Analysis". Pfeiffer et al. Univ. of Mannheim, Mannheim, Germany. ACM Multimedia. 1996.

Article: "SpeechSkimmer: A System for Interactively Skimming Recorded Speech". Barry Arons. ACM Transactions on Computer–Human Interaction, vol. 4, No. 1, pp. 3–38. 1997.

* cited by examiner

Present System

Indexing Logic

Audio Features Test

Fig. 4  Silence Test
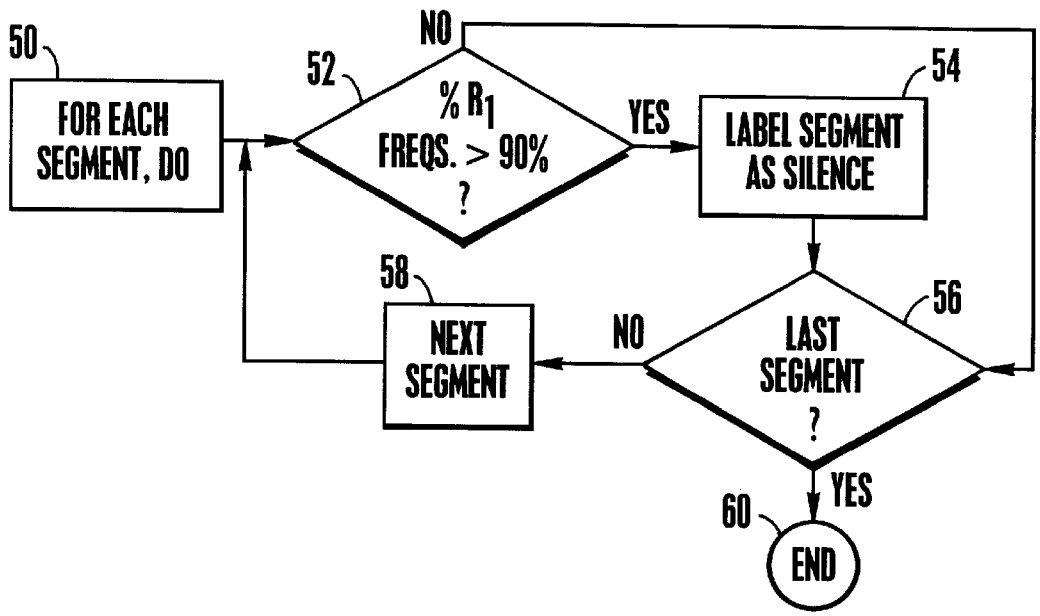
Fig. 5  Speech Test
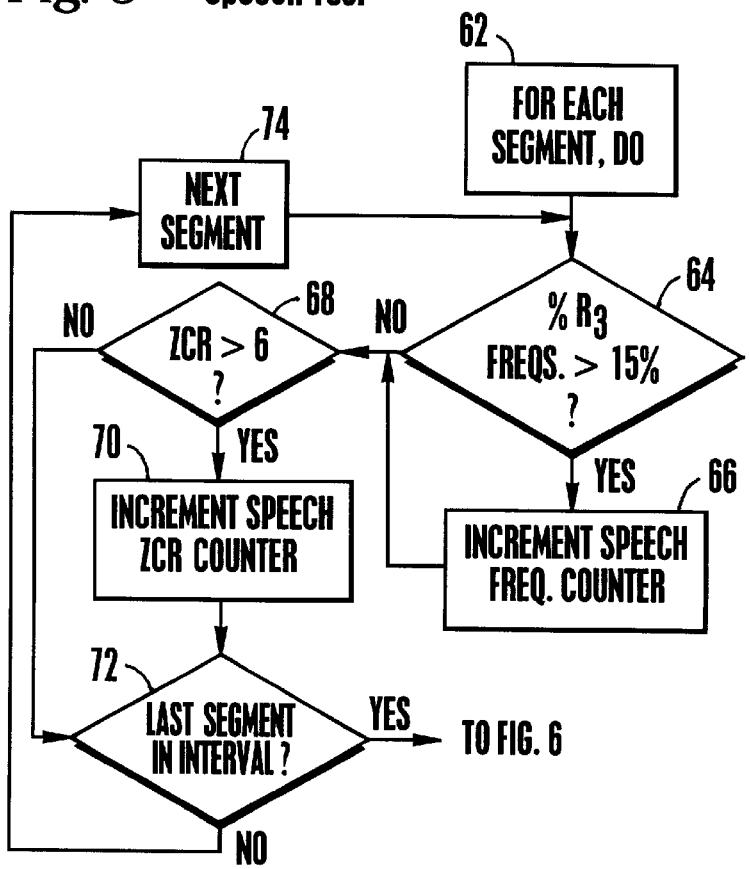

Fig. 6 Speech (con't)
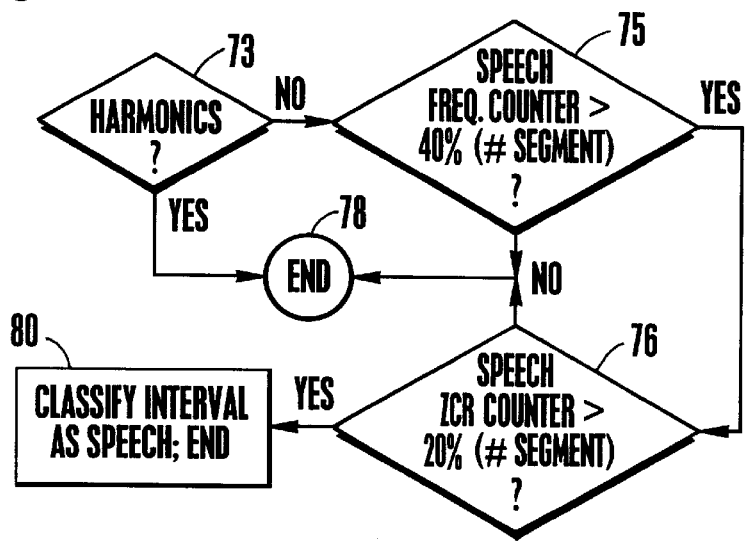
Fig. 7 Music Test
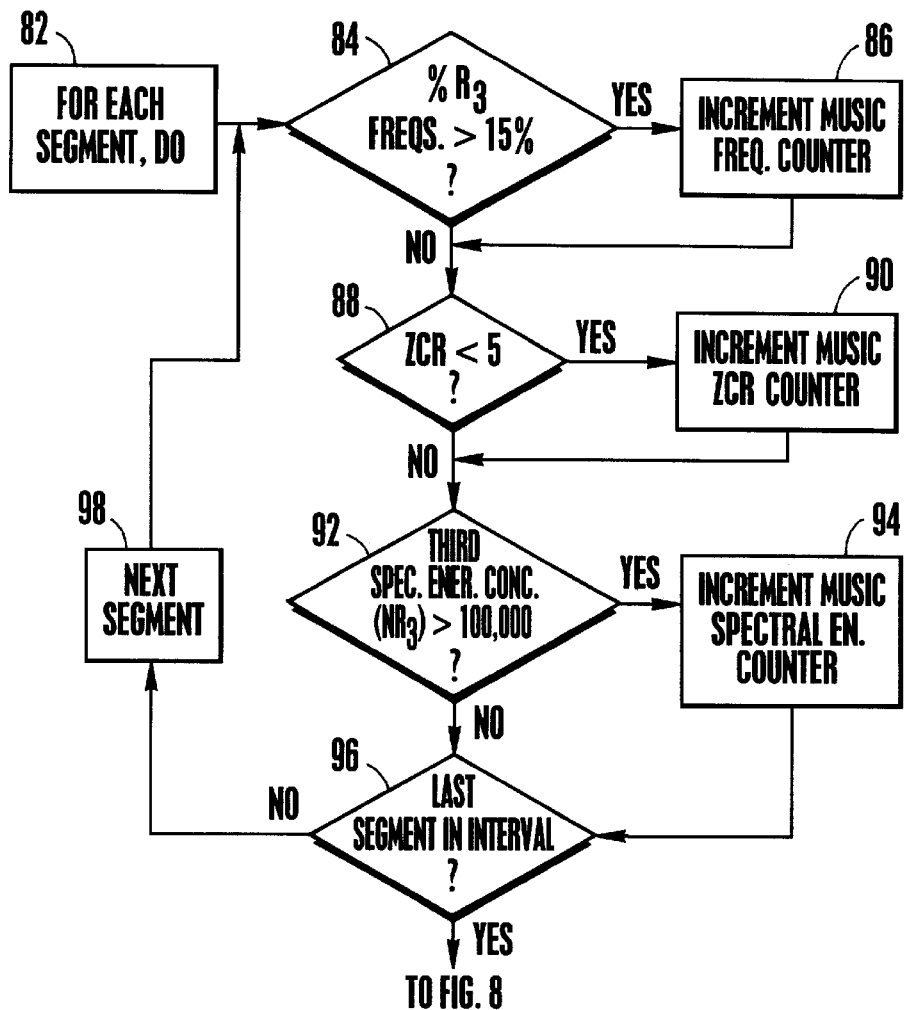

Music Test (con't)

Speech On Music (SOM) Test

Speech On Music
(con't)

Logic To Skim, Gist, or Summarize

Audio Indexing & Classification Logic

Logic To Detect Emphasis, Conclusion, & Important Ideas

Harmonics Detection Logic

Summarization & Skimming Logic

User Interface

SYSTEM AND METHOD FOR AUTOMATIC AUDIO CONTENT ANALYSIS FOR WORD SPOTTING, INDEXING, CLASSIFICATION AND RETRIEVAL

BACKGROUND OF THE INVENTION

1. Field of the Invention

The present invention relates generally to audio streams including audio streams extracted from video, and more particularly to systems and methods for classifying and indexing audio streams to support subsequent retrieval, gisting, summarizing, skimming, and general searching of the audio streams.

2. Description of the Related Art

Accompanying the burgeoning growth of computer use in general and multimedia computer applications in particular, a large amount of audio continues to be produced from, e.g., audio-video applications, and the audio then electronically stored. As recognized by the present invention, as the number of audio files grows, it becomes increasingly difficult to use stored audio streams quickly and efficiently using only existing audio file directories or other existing means for access. For example, it might be desirable to access an audio stream derived from, e.g., video, based on a user query to retrieve information, or to present a summary of audio streams, or to enable a user to skim or gist an audio stream. Accordingly, the present invention recognizes a growing need to efficiently search for particular audio streams to which access is desired by a user but which might very well be stored with thousands of other audio streams.

Conventional information retrieval techniques are based on the assumption that the source text, whether derived from audio or not, is free of noise and errors. When a source text is derived from audio, however, the above assumption is a poor one to make. This is because speech recognition engines are used to convert an audio stream to computer-stored text, and given the inexact nature and inherent difficulty of the task, such conversion is virtually impossible to accomplish without errors and without introducing noise in the text. For example, certain words in an audio stream may not be recognized correctly (e.g., spoken "land" might be translated to "lamb") or at all, thereby diminishing the recall capability and precision of an information retrieval system. By "precision" is meant the capability of a system to retrieve only "correct" documents, whereas "recall" refers to a system's capability in retrieving as many correct documents as possible. Fortunately, we have recognized that it is possible to account for limitations of speech recognition engines in converting audio streams to text, and that accounting for these limitations, it is possible to improve the precision and recall of an information retrieval system.

In addition to the above considerations, the present invention recognizes that in many instances, a user might want to recall a digitally stored audio stream to listen to it, but the user might not wish to listen to or access information from an entire audio stream, but only from particular portions of it. Indeed, a user might wish only to hear a summary of an audio stream or streams, or to gain an understanding of the gist of an audio stream. For example, a user might wish only to hear portions of audio streams having to do with particular topics, or spoken by particular people, or, in the case of recorded programming, a user might prefer to listen only to non-commercial portions of the programming. Similarly, a user might want to "fast forward" through audio. For example, a user might want to speed up "less interesting" portions of an audio stream (e.g., commercials) while keeping "interesting" portions at a comprehensible speed.

Past efforts in audio content analysis, however, such as those disclosed in Japanese patent publications 8063184 and 10049189 and European patent publication 702351, have largely focused not on the above considerations, but rather simply on improving the accuracy of speech recognition computer input devices, or on improving the quality of digitally-processed speech. While perhaps effective for their intended purposes, these past efforts do not seem to consider and consequently do not address indexing audio streams based on audio events in the streams, to support subsequent searching, gisting, and summarization of computer-stored audio streams.

U.S. Pat. No. 5,199,077 discloses wordspotting for voice editing and indexing. This method works for keyword indexing of single speaker audio or video recordings. The above-mentioned Japanese patent publications 8063184 and 10049189 refer to audio content analysis as a step towards improving speech recognition accuracy. Also, Japanese patent publication 8087292A uses audio analysis for improving the speed of speech recognition systems. The above-mentioned European patent publication EP702351A involves identifying and recording audio events in order to assist with the recognition of unknown phrases and speech. U.S. Pat. No. 5,655,058 describes a method for segmenting audio data based on speaker identification, while European patent publication EP780777A describes the processing of an audio file by speech recognition systems to extract the words spoken in order to index the audio.

The methods disclosed in these systems target improving the accuracy and performance of speech recognition. The indexing and retrieval systems disclosed are based on speaker identification, or direct application of speech recognition on the audio track and the use of words as search terms. The present system, in contrast, is directed towards indexing, classification, and summarization of real world audio which, as understood herein, seldom consists of single speaker, clear audio consisting of speech segments alone. Recognizing these considerations, the present invention improves on prior word spotting techniques using the system and method fully set forth below, in which music and noise is segmented from the speech segments, speech recognition applied to the clear speech segments, build an advanced retrieval system built which takes the results of audio analysis into account.

Other techniques have been described for analyzing the content of audio, including the method disclosed in Erling, et al. in an article entitled "Content-Based Classification, Search, and Retrieval of Audio", published in IEEE Multimedia, 1996 (hereinafter "Musclefish"). The method by which Musclefish classifies sounds, however, is not driven by heuristically determined rules, but rather by statistical analysis. As recognized by the present invention, heuristically determined rules are more robust than statistical analyses for classifying sounds, and a rule-based classification method can more accurately classify sound than can a statistics-based system. Furthermore, the Musciefish system is intended to be used only on short audio streams (less than 15 seconds). This renders it inappropriate for information retrieval from longer streams.

Still other methods have been disclosed for indexing audio, including the method disclosed by Pfeiffer et al. in an article entitled "Automatic Audio Content Analysis", published in ACM Multimedia 96 (1996) (hereinafter "MoCA"). Like many similar methods, however the MoCA method is domain specific, i.e., it seeks to identify audio that is related to particular types of video events, such as violence. The present invention recognizes that many audio and multimedia applications would benefit from a more generalized ability to segment, classify, and search for audio based on the content thereof, and more specifically based on one or more predetermined audio events therein.

SUMMARY OF THE INVENTION

A method is disclosed for facilitating reliable information retrieval, also referred to as "word spotting", in long, unstructured audio streams, including audio streams that have been extracted from audio-video data. The present invention uses special audio prefiltering to identify domain/application specific speech boundaries to index only relevant speech segments that are generated by a speech recognition engine, to facilitate, among other applications disclosed below, subsequent reliable word spotting. To do this, the invention analyzes the content of audio streams to identify content specific, application specific, genre specific clear speech boundaries with associated confidence levels. Then, the invention uses confidence levels generated by a speech recognition engine and combines the confidence levels with inventive weighting to index a transcript of only selected portions of the audio (i.e., relevant speech) as generated by the speech recognition engine. Thus, the present invention does not seek to improve speech recognition engines per se, but to improve the precision and recall of information retrieval systems (that might use speech recognition engines) by improving the way in which audio streams are indexed.

The invention can be implemented as a general purpose computer programmed according to the inventive steps herein to classify and index audio signals, also referred to herein as audio streams, including audio extracted from video, for subsequently presenting to a user a visual summary of the audio streams to allow the user to browse, or skim, the streams and play back only those audio segments that are of interest, and/or to index audio streams for information retrieval.

The invention can also be embodied as an article of manufacture—a machine component—that is used by a digital processing apparatus and which tangibly embodies a program of instructions that are executable by the digital processing apparatus to undertake the present logic. This invention is realized in a critical machine component that causes a digital processing apparatus to perform the inventive method steps herein. In other aspects, a computer program product is disclosed which is readable by a digital processing apparatus and which tangibly embodies a computer program. The computer program product combines a computer readable medium with program code elements that undertake the logic disclosed below. And, a computer-implemented method is disclosed for executing the logic herein.

Accordingly, in one aspect a computer-implemented method for analyzing an audio signal includes detecting audio events in one or more intervals of the audio signal, with each interval including a temporal sequence of one or more segments. The audio events are analyzed to identify speech boundaries with associated confidence levels, and the method then indexes the audio signal based on the speech boundaries and confidence levels using heuristically determined rules to improve precision. Also, the method indexes alternatives to at least one word in the audio signal along with an associated weight to improve recall for the subsequent undertaking of one or more of: word spotting, summarizing, and skimming the audio signal, using the indexing.

In another aspect, a computer is disclosed for classifying and indexing an audio signal. As set forth in detail below, the computer embodies computer usable code means that include logic means for rendering the audio signal into intervals, with each interval including one or more segments. Logic means then determine whether the segments of an interval exhibit one or more predetermined audio features, which can also be referred to as "audio characteristics", with each audio feature being representative of at least one respective audio event. Also, logic means classify the intervals by associating the intervals with respective audio events in response to the means for determining. Further, logic means are provided for determining whether at least one group of intervals matches a meta pattern in a predefined set of meta patterns, and logic means associate the group of intervals with a meta pattern classification when it is determined that the group of intervals matches a meta pattern. Logic means then index the audio signal based on interval classifications and meta pattern classifications.

In a preferred embodiment, logic means process only relevant portions of the audio signal using a speech recognition engine to render words from the signal. The engine generates both the recognized words and alternatives to them, with associated confidence levels. In a simple implementation, we index only the longer words (three characters or more) with confidence levels for recognition being 90% or more. A more general purpose solution is to index the recognized words and alternatives based on weights, where the weight depends on the confidence level of recognition, confidence value of alternative words (if any), the length of the recognized word, and on whether Also in a preferred embodiment, each predetermined audio feature is based on one or more of: zero crossing rate (ZCR) of at least a portion of the audio signal, energy of at least a portion of the audio signal, spectral energy (SE) concentration of at least a portion of the audio signal, and frequency (F). Also in the preferred embodiment, the predefined set of audio events includes music, speech, silence, and speech on music. With respect to the meta patterns, the predefined set of patterns can include, but is not limited to, continuous uninterrupted speech (such as a newscast or educational program) and music combined with speech (such as a commercial), with the predefined set of patterns being heuristically defined.

Still further, the present invention envisions classifying and indexing audio streams that contain speech based on "interesting events" in speech such as emphasis in speech, hesitation in speech, and concluding ideas in speech. Accordingly, means are provided for determining a dominant frequency in each one of a sequence of samples of at least one interval that has been classified as speech. Speech intervals are associated with emphasis in speech when they include a top N % of the dominant frequencies, wherein N is a heuristically determined number, preferably one (1). On the other hand, speech intervals are associated with concluding ideas in speech when they include a bottom N % of the dominant frequencies. Further, if temporally sequential intervals, all associated with emphasis in speech, define a period greater than a predetermined period, the entire sequence is indexed as an important idea in speech.

In a particularly preferred embodiment, logic means are provided for normalizing the segments, prior to classifying the intervals. Moreover, logic means present the index of the intervals and meta pattern classifications for skimming, gisting, and summarizing the audio signal, using the indexing of the signal.

To determine whether a segment of an interval exhibits one or more predetermined audio features, means are provided for determining whether one or more audio features associated with the segment equals a respective threshold. If so, a counter associated with the audio feature is incremented, and after all segments in an interval have been tested, the counters are compared to the number of segments in the interval and the interval then classified based on the comparison.

In another aspect, a computer program product includes a computer program storage device that is readable by a digital processing apparatus, and a program means is on the program storage device. The program means includes program code element that are executable by the digital processing apparatus for performing method steps for indexing at least one audio signal, for subsequent summarization of the signal to allow a user to use the summary to browse and/or play back only types of audio that are of interest. In accordance with the present invention, the method steps include rendering the audio signal into intervals, with each interval including one or more segments, and determining whether the segments of an interval exhibit one or more predetermined audio features selected from the set of features including zero crossing rate of at least a portion of the audio signal, energy of at least a portion of the audio signal, frequency of at least a portion of the audio signal, and spectral energy concentration of at least a portion of the audio signal. As intended by the present invention, each audio feature represents at least one respective audio event including at least music and speech. The intervals are classified by associating the intervals with respective audio events, and the audio signal indexed based at least in part on the interval classification.

The details of the present invention, both as to its structure and operation, can best be understood in reference to the accompanying drawings, in which like reference numerals refer to like parts, and in which:

BRIEF DESCRIPTION OF THE DRAWINGS

FIG. 4 is a flow chart of the logic for determining whether a segment is silence;

FIG. 5 is a flow chart of the logic for determining whether a segment is speech;

FIG. 6 is a flow chart continuing the logic shown in FIG. 5;

FIG. 7 is a flow chart of the logic for determining whether a segment is music;

DETAILED DESCRIPTION OF THE PREFERRED EMBODIMENTS

Figure 1:
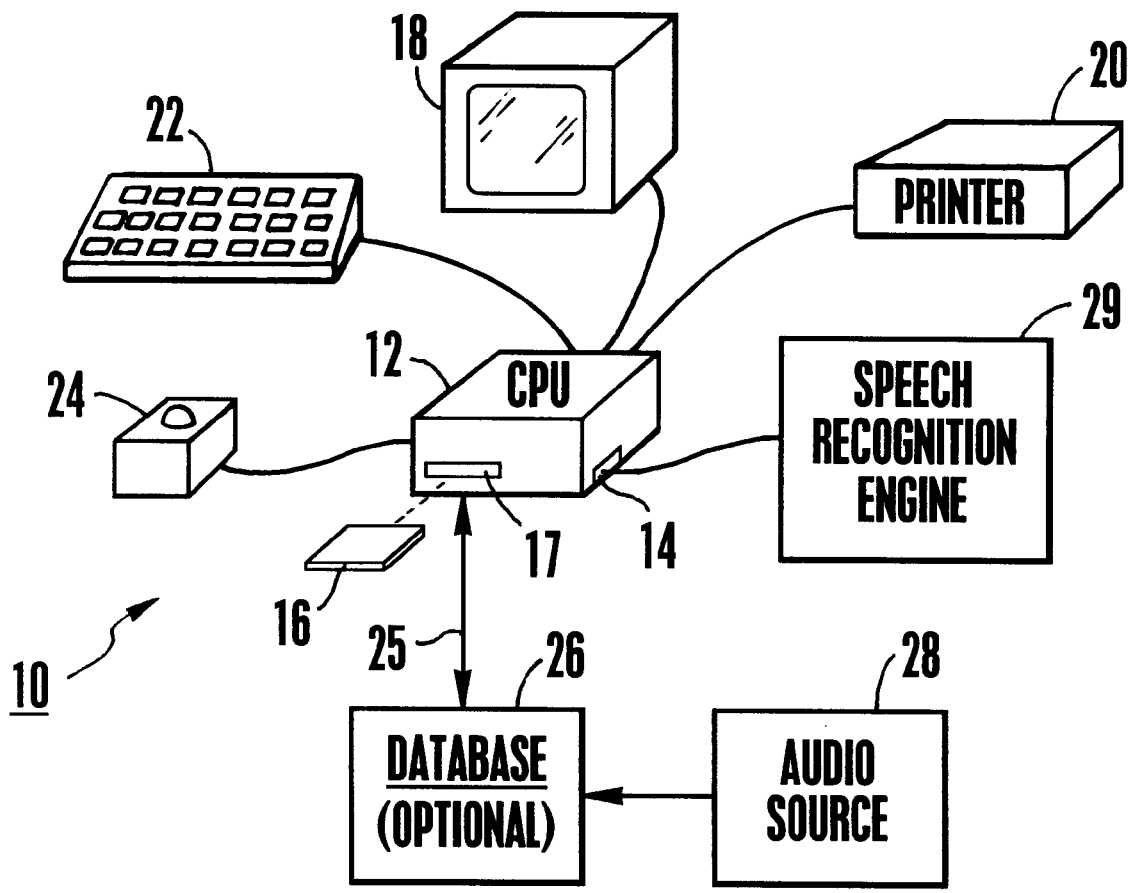
FIG. 1 is a schematic diagram of the present system.

Referring initially to FIG. 1, a system for analyzing audio content (including audio content of audio-visual data) for indexing, classifying, and retrieving the audio is shown, generally designated 10. In the particular architecture shown, the system 10 includes a digital processing apparatus, such as a computer 12. In one intended embodiment, the computer 12 may be a personal computer made by International Business Machines Corporation (IBM) of Armonk, N.Y. as shown, or the computer 12 may be any computer, including computers sold under trademarks such as AS400, with accompanying IBM Network Stations. Or, the computer 12 may be a Unix computer, or OS/2 server, or Windows NT server, or IBM RS/6000 250 workstation with 128 MB of main memory running AIX 3.2.5., or an IBM laptop computer.

The computer 12 includes an audio engine 14, schematically shown in FIG. 1, which may be executed by a processor within the computer 12 as a series of computer-executable instructions. These instructions may reside, for example, in RAM of the computer 12.

Alternatively, the instructions may be contained on a data storage device with a computer readable medium, such as a computer diskette 16 shown in FIG. 1 that is engageable with a floppy disk drive 17 of the computer 12. Or, the instructions may be stored on a DASD array, magnetic tape, conventional hard disk drive, electronic read-only memory, optical storage device, or other appropriate data storage device. In an illustrative embodiment of the invention, the computer-executable instructions may be lines of C++ code.

FIG. 1 also shows that the system 10 can include peripheral computer equipment known in the art, including an output device such as a video monitor 18 and/or printer 20 and an input device such as a computer keyboard 22 and/or mouse 24. Other output devices can be used, such as other computers, and so on. Likewise, input devices other than the keyboard 22 and mouse 24 can be used, e.g., trackballs, keypads, touch screens, and voice recognition devices.

The computer 12 can access, via a data transmission path 25, an electronically-stored database 26 that contains audio data. The audio data can be input into the database 26 from an appropriate audio source 28. It is to be understood that the audio data can be input directly to the engine 14 from the audio source 28, which can be a source of analog or digitized audio, such as, e.g., a broadcast network or radio station. It is to be further understood that the database 26 can be locally stored on the computer 12, in which case the path 25 is an internal computer bus, or the database 26 can be remote from the computer 12, in which case the path 25 is a local area network or wide area network such as the Internet. For purposes to be described shortly, the engine 14 access a speech recognition engine 29. The speech recognition engine 29 can be any suitable speech recognition engine, such as, e.g., the one disclosed in U.S. Pat. No. 5,293,584, owned by the same assignee as the present invention and incorporated herein by reference. The speech recognition engine 29 can be the present assignee's "Large Vocabulary Continuous Speech Recognition" system.

Figure 15:
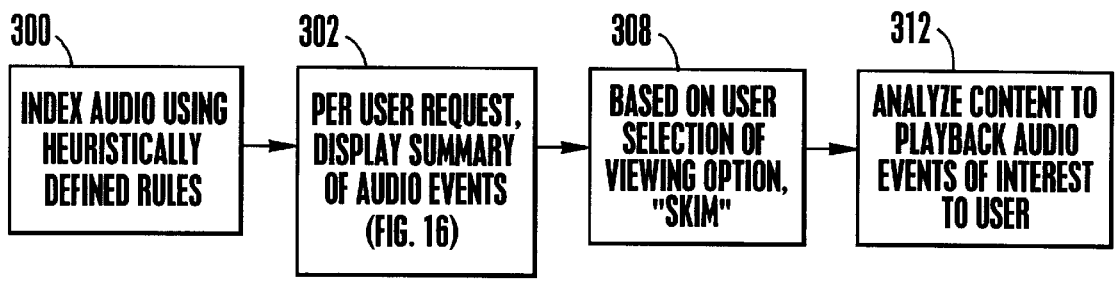
FIG. 15 is a flow chart showing the summaries resulting from the indexed audio stream.
Figure 16:
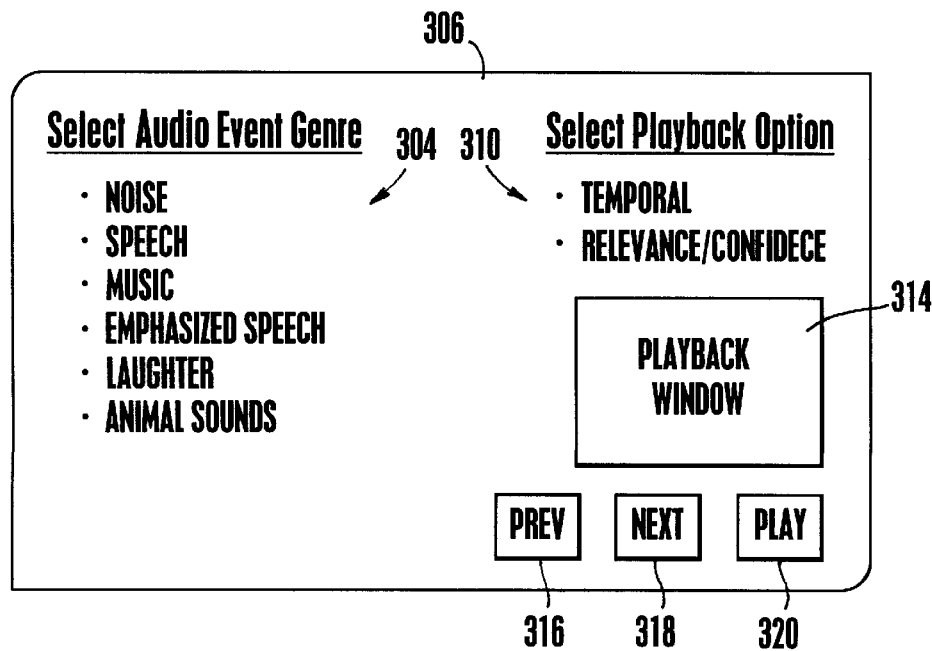
FIG. 16 is a schematic view of a screen summarizing audio streams that have been indexed.

To illustrate applications of the present invention, namely, summarizing and skimming, reference is made to FIG. 15. Commencing at block 300, a received audio stream is indexed using the heuristically defined rules set forth below. Then, at block 302 a summary of the indexed audio is displayed per user's request. Such a summary 304 is shown in the display screen 306 in FIG. 16, it being understood that the display screen 306 can be presented on the monitor 18 (FIG. 1). As shown, the summary 304 can consist of audio genre, including noise, speech, music, emphasized speech, laughter, animal sounds, and so on.

Moving to block 308 in FIG. 15, a viewing or playback option is selected by the user from a playback option menu 310 (FIG. 16), and based on the user selection the selected audio is "slimmed", i.e., played back without intervening non-selected audio. As shown, the user can select to play back audio of the genre selected at block 302 in temporal sequence, or by relevance, i.e., confidence or likelihood that the audio is actually of the type selected. If the user selects "relevance", the process moves to block 312 of FIG. 15 to analyze the indexed audio to play back only audio events of interest to the user.

The identification of the audio being played back can be displayed in a playback window 314, on the screen 306. If the audio is derived from video, the video can be played back on the window 314. The user can also select a "previous" button 316 to select the previous audio clip, a "next" button 318 to select the next audio clip, and a "play" button 320 to hear the selected clip, i.e., to cause the selected clip to be played. As mentioned above, however, the present invention has other applications as well, including information retrieval by word spotting. Regardless of the application, the ability of the present invention to effectively index audio renders subsequent applications easier to execute, and, in the case of word spotting, more precise, with improved recall.

Figure 2:
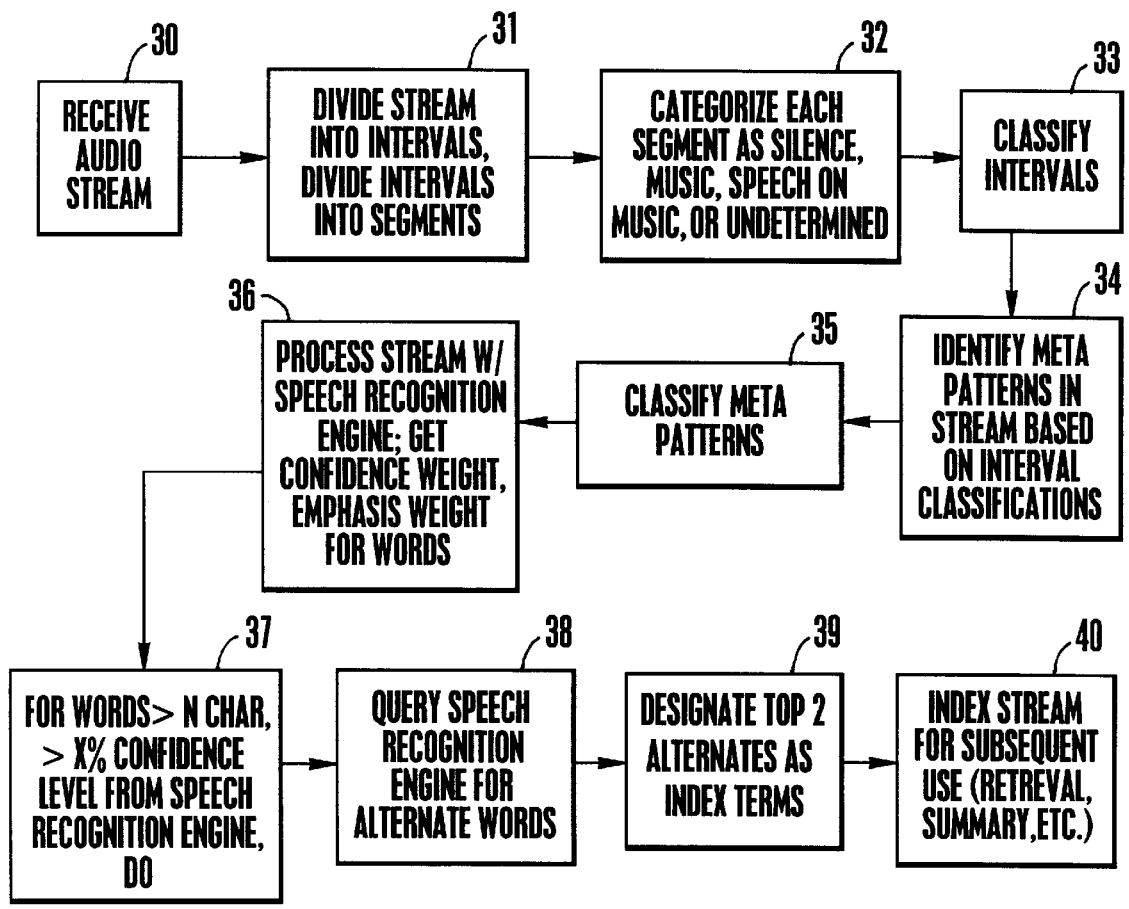
FIG. 2 is a flow chart of the overall indexing logic of the present invention.

Accordingly, turning now to the logic of the present invention in indexing audio streams, reference is made to FIG. 2. Commencing at block 30, the audio stream is received by the audio engine 14. It is to be understood that the stream can be transformed using a short form of the fast Fourier transformation (FFT) function, and then the low amplitude noise components of the FFT are filtered out of the signal, prior to the below-disclosed steps.

Moving to block 31, the stream is divided into temporally successive intervals of, e.g., two seconds duration, with each interval in turn being divided into one or more segments of, e.g., one hundred milliseconds (100 ms) duration. Intervals and segments of different durations can be used within the scope of the present invention, however.

From block 31, the logic moves to block 32 to test each segment to determine whether the segment can best be classified as one of a predetermined set of audio events by determining the audio features of each segment, as more fully set forth below. The predetermined audio events in the presently preferred embodiment include silence, speech, music, and speech on music. If a segment cannot be classified, it is designated as a segment of indeterminant classification.

The logic next proceeds to block 33, wherein each interval is classified by associating the interval with one of the audio events, i.e., each interval is correlated to one of the above-disclosed audio events, based on the test results of its segments obtained at block 32. Then, at block 34 it is determined whether a temporal sequence of intervals (with some allowance, if desired, for occasional "missing" intervals) matches one of a set of heuristically predefined meta pattern genre. The presence of meta patterns in the audio signal or stream are identified in the audio stream based on the interval classifications obtained at block 33. For instance, thirty seconds of short, alternating sequences of music, speech, and speech on music in any order might match a predefined "commercial" meta pattern genus and thus be so classified at block 35, with what constitutes any particular meta pattern genus being heuristically determined. Or, a sequence of interval classifications of speech-music-speech might match a meta pattern heuristically predefined to establish an "education/training" genus. Other meta pattern genre such as "cartoons" and "news" can likewise be heuristically predefined. Indeed, meta patterns of meta patterns can be heuristically predefined, such as defining a meta pattern "broadcast news break" to be four and only four commercial meta patterns in sequence. Accordingly, a large number of meta pattern genre can be defined heuristically that fall within the scope of the present invention. It can now be appreciated that a meta pattern essentially is a predefined sequence of variously classified intervals.

From block 35, the process moves to block 36 to process selected portions of the audio stream with the speech recognition engine 29 (FIG. 1). The speech recognition engine 29 converts the portions of the audio stream it processes into text, represented by words composed of one or more alphanumeric characters. Importantly, the entire audio stream need not be processed at block 36. Instead, only portions of the audio stream, e.g., those classified as "newscasts" in block 35, can be sent to the speech recognition engine for processing. As recognized herein, processing a long, unstructured audio stream that might include several different types of domain/application speech boundaries with a speech recognition engine can lead to errors in the output of the speech recognition engine. For example, a speech recognition engine can produce many errors when it attempts to convert to text a segment having both speech and music. Accordingly, processing only particular (relevant) types of domain/application speech segments reduces the errors caused by inherent shortcomings in conventional speech recognition engines.

As also indicated at block 36, while the selected audio portions are converted to text, two weights, referred to as "confidence level" weight and "emphasis" weight, are used for at least some, and preferably all, of the words that are rendered. The weights are based in part on whether a particular word was derived from an "emphasized" speech segment as set forth further below.

Next, at block 37, a "DO" loop is entered only for words that satisfy the following two criteria: the word must have a length at least as long as "N" characters, wherein "N" is an integer preferably equal to, e.g., three, and the word must have been returned from the speech recognition engine 29 with a confidence level of at least ninety percent (90%). The confidence level could be a range of probabilities if desired. The present invention thus exploits the characteristic of speech recognition engines to make more accurate conversions of longer spoken words to text, as compared to the accuracy of speech engines in converting shorter spoken words to text. The step at block 37 can be thought of as a filter in which words of length less than "N" are not indexed. As an alternative, words of all lengths can be considered at block 37, with shorter words later pruned or ranked relatively low at the time of retrieval.

The "DO" loop proceeds to block 38, wherein the speech engine 29 is queried for alternatives to the word under test. At block 39, preferably the top two alternatives are identified as terms to be indexed along with the word under test, although all alternatives can be considered if desired. Like the word under test, weights are assigned to the alternatives. Similarly, alternate word lattices, rather than single word alternates, can be used. Then, at block 40, the stream is indexed using the words and alternatives, along with the respective weights, for subsequent retrieval by, e.g., an information retrieval system such as the system known in the art as "Okapi". With the above disclosure in mind, it can be appreciated that to support subsequent information retrieval of text based on a query, only relevant speech segments are indexed at block 40.

With respect to retrieval, as recognized by the present invention words that do not exist in the vocabulary of a word recognition system will not be present in the transcript that is generated; hence, if queried for, such out-of-vocabulary words will not return any results. With this in mind, a retrieval system such as "Okapi" can be modified such that when a query returns no results, the retrieval system accesses a thesaurus derived from a corpus of similar domain (for example, broadcast news, office correspondence, or medicine) to expand or substitute out-of-vocabulary words in the query with words in the thesaurus.

As mentioned above, weights are calculated for each word (and its alternatives, if any). The weight assigned to a word depends on several factors, including the associated confidence level returned by the speech recognition engine, the inverse document frequency, and whether the word was "emphasized". In a particularly preferred embodiment, the weight of a word is determined as follows:
if
$\alpha_1 = 0.5$ and $\alpha_2 = 1 + \alpha_1$ (empirically determined);
$L_d$=length of document "d" and L' is the average document length;
$q_k = k^{th}$ term in the query;
$C_d(q_k)$ is the count for query term "k" of document "d";
$EC_d(q_k) = E_{dk}$ is the expected count for query term "k" of document "d";
$C_q(q_k)$=count of the $k^{th}$ term in the query "q";
$E_q(q_k) = E_{qk}$ expected count of the $k^{th}$ term in the query "q";
$n(q_k)$=number of documents that contain the term $q_k$;
$n'(q_k)$=expected number of documents that contain the term $q_k$;
Q'=total number of terms in query including all alternate words as described above and N is the total number of documents;
$p_i(q_k)$=weight indicating confidence level of $i^{th}$ occurrence of $k^{th}$ query term, from word recognition engine;
$e_i(q_k)$=weight indicating emphasis of $i^{th}$ occurrence of $k^{th}$ query term;
then the inverted document frequency for the $k^{th}$ query term=idf($q_k$):

$$idf(q_k) = \log\{(N - n'(q_k) + \alpha_1)/(n'(q_k) + \alpha_1)\}$$

and the relevance score to rank document "d" against query "q" =S(d,q):

$$S(d,q) = \text{sum from } k=1 \text{ to } Q' \text{ of } \{E_{dk}*E_{qk}*idf(q_k)\}/\{\alpha_1 + \alpha_2(1_d/1') + E_{dk}\}$$

where
$E_{dk}$=sum of the products from i=1 to Q' of $\{p_i(q_k)*e_i(q_k)\}$ on document "d", and
$E_{qk}$=sum of the products from i=1 to Q' of $\{p_i(q_k)*e_i(q_k)\}$ on query "q".

When the query is typed and all terms have the same emphasis, $e_i(q_k)$ is a constant, e.g., "e". On the other hand, when the user wishes to modify the emphasis of a term, he or she can type in a prefix symbol such as "+word", in which case $e_i(q_k)$ has a default value between 0 and 1 inclusive chosen by the system. If the query is spoken and, hence, inherently has emphasized terms, the logic below for finding emphasis in speech is used to determine the emphasis prefix of each term, and $e_i(q_k)$ has a value between 0 and 1.

Figure 3:
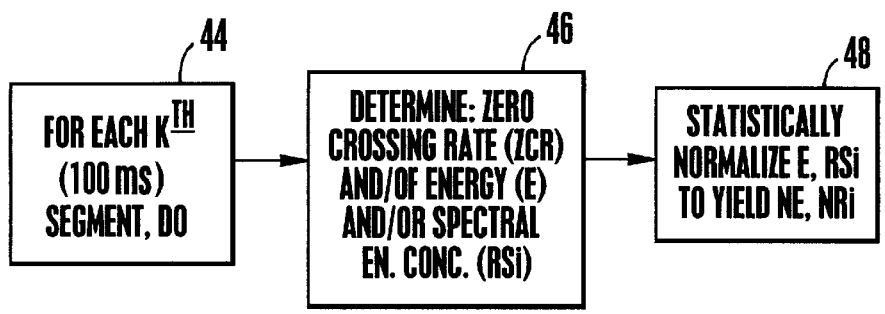
FIG. 3 is a flow chart of the logic for determining audio features of the segments.
Figure 8:
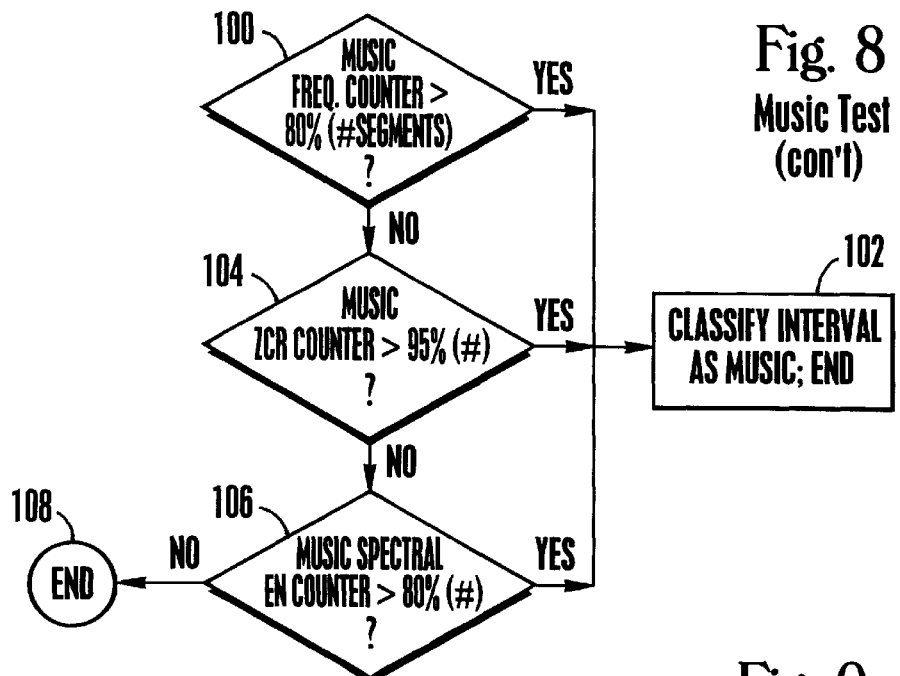
FIG. 8 is a flow chart continuing the logic shown in FIG. 7.

FIG. 3 shows further details of the processing of each segment from the audio stream. Commencing at block 44, a DO loop is entered wherein for each $k^{th}$ segment, one or more sound features are determined at block 46 and normalized at block 48. More specifically, at block 46 a zero crossing rate (ZCR), energy (E), and spectral energy concentration ($RS_i$) for each segment can be determined, as well as the frequencies falling within various predefined ranges$_i$. As set forth below, all or only a subset of these audio features can be used.

By "zero crossing rate" is meant the number of times in a segment that the audio signal amplitude passes through a value of zero. By "energy" is meant the sum of the squared audio signal amplitude values of each segment. In contrast, the spectral energy concentration for each segment is established by plural $RS_i$ values, one for each $i^{th}$ frequency range, that is defined to be the sum of the squares of the frequencies in each $i^{th}$ frequency range present in the segment. In the preferred embodiment, four frequency ranges are used. By way of example only, the first frequency range R1 is 0–1000 Hz, the second frequency range R2 is 1000–8000 Hz, the third frequency range R3 is 8000–16,000 Hz, and the fourth frequency range R4 is greater than 16,000 Hz.

Audio features other than the above-disclosed preferred features can be used, however. For example, brightness (the centroid of the short form Fourier magnitude spectra stored as a log frequency) can be used, as can bandwidth, harmonicity (the deviation of the sound's line spectrum from a perfectly harmonic spectrum), and tonality.

At block 48 the calculated audio features are statistically normalized. The normalized version of a measured audio feature is the quotient of the difference between the measured audio feature and the mean value of that feature over all segments, and the standard deviation of that feature for all segments. For example, the normalized spectral energy concentration $NR_i$ for a segment is given by:

$$NR_i = (RS_i - \text{mean}(RS_i))/\sigma_{RSi}$$

Now referring to FIG. 4, the logic by which the present invention tests the audio segments can be seen. It is to be understood that FIGS. 4–10 illustrate a preferred set of heuristics, with accompanying preferred thresholds, for defining the various tests for speech, silence, music, and so on, and that other specific heuristics and/or thresholds can be defined. Commencing at block 50, a DO loop is entered for each segment in an interval. Proceeding to decision diamond 52, it is determined whether the percentage of frequencies in the segment that lie in the first frequency band R1, compared to all sampled frequencies in the segment under test, is greater than 90%. When the preferred sampling frequency of 44 KHz and segment duration of 100 ms are used, twenty (20) samples per segment are obtained.

If more than 90% of the sampled frequencies of the segment are in the first frequency band R1, the process moves to block 54 to label or otherwise designate or classify the segment as "silence". From block 54, or from decision diamond 52 if the test there was negative, the logic proceeds to decision diamond 56 to determine whether the last segment in the interval has been tested, and if not, the logic moves to block 58 to obtain the next segment, and thence to loop back to decision diamond 52. When the last segment has been tested, however, the logic ends at state 60.

FIG. 5 shows the present test for determining whether a segment is a segment of speech. Commencing at block 62, a DO loop is entered for each segment in an interval. Proceeding to decision diamond 64, it is determined whether the percentage of frequencies in the segment that lie in the third frequency band R3, compared to all sampled frequencies in the segment under test, is greater than 15%. If so, a SpeechFreq counter is incremented by unity at block 66.

From block 66 or from decision diamond 64 if the test there was negative, the logic moves to decision diamond 68 to determine whether the zero crossing rate (ZCR) of the segment under test is greater than six (6). If so, a SpeechZCR counter is incremented by unity at block 70. From block 70, or from decision diamond 68 if the test there was negative, the logic proceeds to decision diamond 72 to determine whether the last segment in the interval has been tested, and if not, the logic moves to block 74 to obtain the next segment, and thence to loop back to decision diamond 64. When the last segment has been tested, however, the logic proceeds to FIG. 6.

As recognized by the present invention, the presence (or absence) of harmonic frequencies in audio can be used to determine whether the audio is music or speech. Spectral analysis is typically used for segmentation of musical harmony or chords towards note analysis and determination of the structure of a piece of music. The present invention, however, uses the absence of detected musical harmonics as a reliable test for speech.

Accordingly, as shown in FIG. 6, after testing the segments of an interval, to classify the interval as "speech", in the preferred embodiment three conditions must be met. More specifically, commencing at decision diamond 73, it is determined whether the interval has been labelled as "harmonic" in accordance with the logic shown in FIG. 14 and discussed below. If not (indicating that the interval is speech), the process moves to decision diamond 74, wherein it is determined whether the value of the SpeechFreq counter is greater than 40% of the number of segments in the interval. In other words, at decision diamond 74 it is determined whether at least 40% of the segments in the interval under test satisfy the condition at decision diamond 64 of FIG. 5. If so, the logic then moves to decision diamond 76 to apply the second test for speech, namely, to determine whether the value of the SpeechZCR counter is less than 20% of the number of segments in the interval under test. In other words, at decision diamond 76 it is determined whether no more than 20% of the segments in the interval under test satisfy the condition at decision diamond 68 of FIG. 5. If either one of the tests at decision diamonds 74, 76 in FIG. 6 is not satisfied, or if the interval was found to be "harmonic" at decision diamond 73, the logic ends at state 78; otherwise, the interval is classified as "speech" and indexed prior to ending, at block 80. It may now be appreciated that a confidence level can also be generated, based on the values of the Speech counters, at the end of the process in FIG. 6, with the confidence level being representative of the likelihood that an interval classified as "speech" actually is speech for subsequent use in matching sequences of intervals to meta patterns.

Now referring to FIG. 7, the present test for determining whether a segment is music is shown. Commencing at block 82, a DO loop is entered for each segment in an interval. Proceeding to decision diamond 84, it is determined whether the percentage of frequencies in the segment that lie in the third frequency band R3, compared to all sampled frequencies in the segment under test, is greater than 15%. If so, a MusicFreq counter is incremented by unity at block 86.

From block 86 or from decision diamond 84 if the test there was negative, the logic moves to decision diamond 88 to determine whether the zero crossing rate (ZCR) of the segment under test is less than five (5). If so, a MusicZCR counter is incremented by unity at block 90. From block 90, or from decision diamond 88 if the test there was negative, the logic proceeds to decision diamond 92 to determine whether the normalized third spectral energy concentration $NR_3$ of the segment under test (as determined above at block 48 in FIG. 3) is greater than one hundred thousand (100,000). If so, a MusicSpectralEn counter is incremented by unity at block 94. From block 94, or from decision diamond 92 if the test there was negative, the logic proceeds to decision diamond 96 to determine whether the last segment in the interval has been tested, and if not, the logic moves to block 98 to obtain the next segment, and thence to loop back to decision diamond 84. When the last segment has been tested, however, the logic proceeds to FIG. 8.

After testing the segments of an interval, to classify the interval as "music" any one of three conditions must be met. More specifically, commencing at decision diamond 100, it is determined whether the value of the MusicFreq counter is greater than 80% of the number of segments in the interval. If so, the logic then moves to block 102 to classify the interval as "music", index the interval, and end. If, however, the segment fails the first test for music at decision diamond 100, the logic proceeds to decision diamond 104 to apply the second test for music, namely, to determine whether the value of the MusicZCR counter is greater than 95% of the number of segments in the interval under test. If the second test is met, the logic classifies the interval as "music" at block 102; otherwise, the logic moves to decision diamond 106 to apply the third test for music.

At decision diamond 106, it is determined whether the value of the MusicSpectralEn counter is greater than 80% of the number of segments. If this test is satisfied, the interval is classified as music at block 102. Only when all three music tests fail does the logic end at state 108 without classifying the segment as "music".

Figure 9:
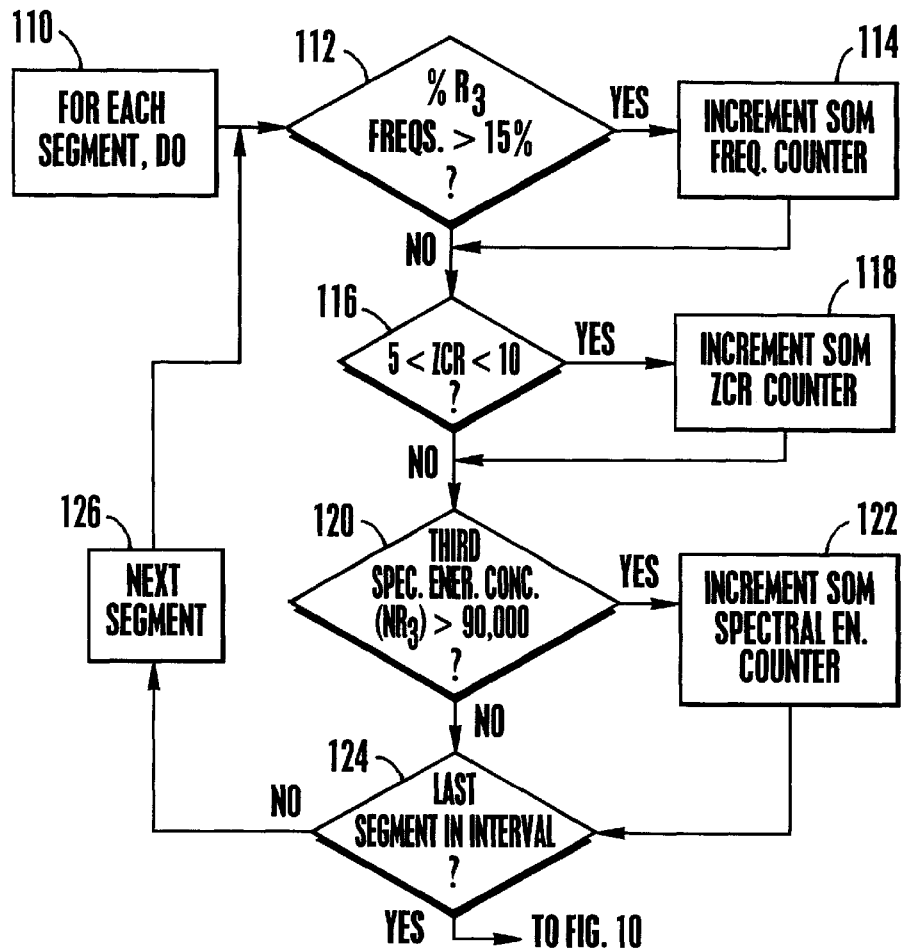
FIG. 9 is a flow chart of the logic for determining whether a segment is speech on music.
Figure 10:
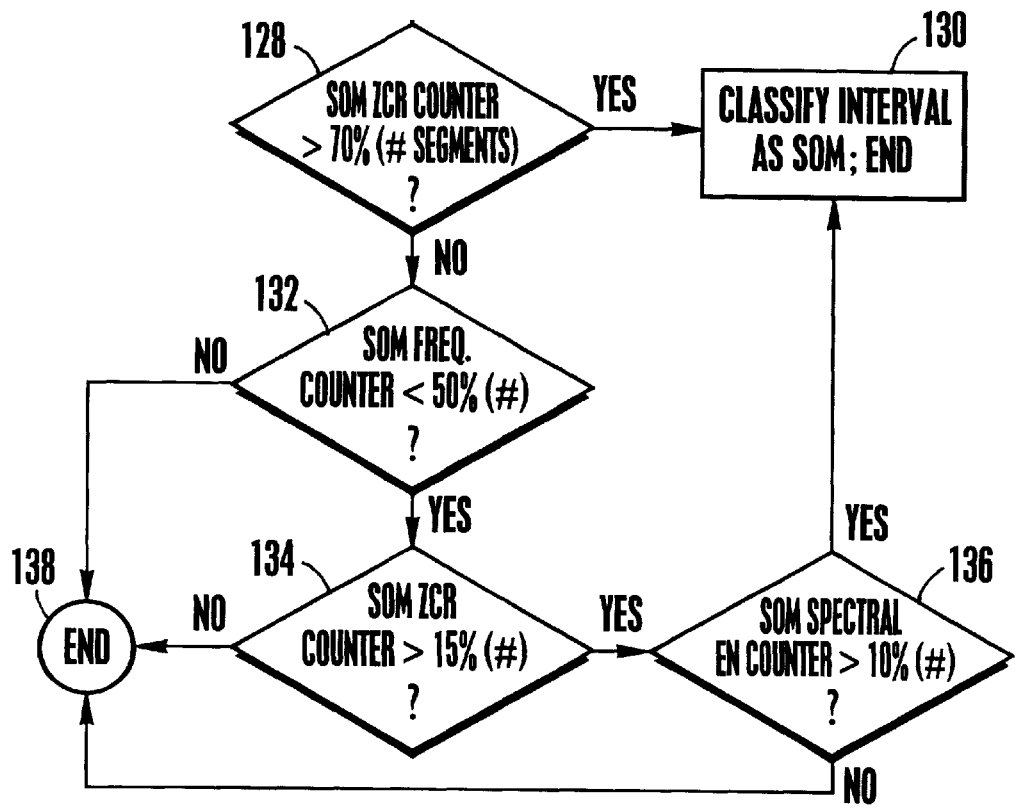
FIG. 10 is a flow chart continuing the logic shown in FIG. 9.

Now referring to FIG. 9, the present test for determining whether a segment is speech on music (SOM) is shown. Commencing at block 110, a DO loop is entered for each segment in an interval. Proceeding to decision diamond 112, it is determined whether the percentage of frequencies in the segment in the third frequency band R3, compared to all sampled frequencies in the segment under test, is greater than 15%. If so, an SOMFreq counter is incremented by unity at block 114.

From block 114 or from decision diamond 112 if the test there was negative, the logic moves to decision diamond 116 to determine whether the zero crossing rate (ZCR) of the segment under test is more than five (5) and less than ten (10). If so, an SOMZCR counter is incremented by unity at block 118. From block 118, or from decision diamond 116 if the test there was negative, the logic proceeds to decision diamond 120 to determine whether the normalized third spectral energy concentration $NR_3$ of the segment under test is greater than ninety thousand (90,000). If so, an SOMSpectralEn counter is incremented by unity at block 122. From block 122, or from decision diamond 120 if the test there was negative, the logic proceeds to decision diamond 124 to determine whether the last segment in the interval has been tested, and if not, the logic moves to block 126 to obtain the next segment, and thence to loop back to decision diamond 112. When the last segment has been tested the logic proceeds to FIG. 10.

After testing the segments of an interval, to classify the interval as "speech on music" one of two conditions, one of them compound, must be met. Commencing at decision diamond 128, it is determined whether the value of the SOMZCR counter is greater than 70% of the number of segments in the interval. If so, the logic then moves to block 130 to classify the interval as "speech on music", index the interval, and end. If, however, the segment fails the first test at decision diamond 128, the logic proceeds to decision diamond 132 to apply the first subtest in a second, compound test for speech on music. Specifically, at decision diamond 132 the logic determines whether the value of the SOMFreq counter is less than 50% of the number of segments in the interval under test. If the first subtest is satisfied, the logic moves to the second subtest at decision diamond 134 to determine whether the value of the SOMZCR counter is greater than 15% of the number of segments in the interval. If this subtest is positive, the logic moves decision diamond 136 to determine whether the value of the SOMSpectralEn counter is greater than 10% of the number of segments. Only when all three subtests of the second, compound test are satisfied does the logic move to block 130 to classify the interval as speech on music; if any one of the subtests at decision diamonds 132, 134, 136 is failed, the logic ends at state 138 without classifying the interval as speech on music. Any interval not classified as silence, speech, music, or speech on music is classified "indeterminant" prior to storing the interval.

Figure 11:
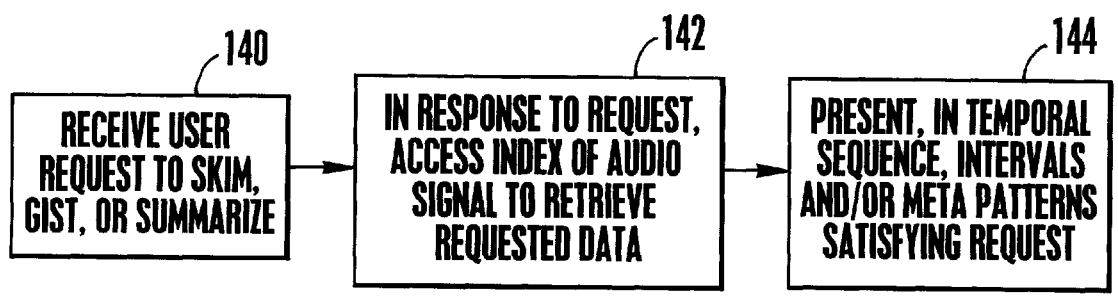
FIG. 11 is a flow chart showing the logic for skimming, gisting, and summarizing.

As discussed above in reference to FIG. 2, once the intervals of an audio stream have been classified, temporally sequential groups of intervals are matched against prestored meta pattern genre to determine whether a group matches one of the meta patterns. The audio stream is then further indexed based on the meta patterns. FIG. 11 shows how a user can search the audio stream, once indexed, for the purpose of summarizing the stream, skimming the stream, and gisting the stream.

Commencing at block 140, a user request is received for the audio stream. At block 142, in response to the user request and using the index of the audio stream generated as set forth above, the requested portion(s) of the audio stream are retrieved. For example, a user might want to access "education audio without the commercials", and only those portions of the audio stream satisfying the "education" meta pattern are returned at block 144. In other words, either the interval or intervals satisfying the request, and/or the index thereof, are returned in temporal order at block 144.

It is to be understood that the index of the audio stream can be presented at block 144 in response to, e.g., a user request to "summarize" the audio stream. The presentation of such a list is a summary of the audio stream. Using the index, the user can scroll through the intervals of the audio stream and select those he or she wishes to hear, to skim and/or "gist" the stream.

Figure 12:
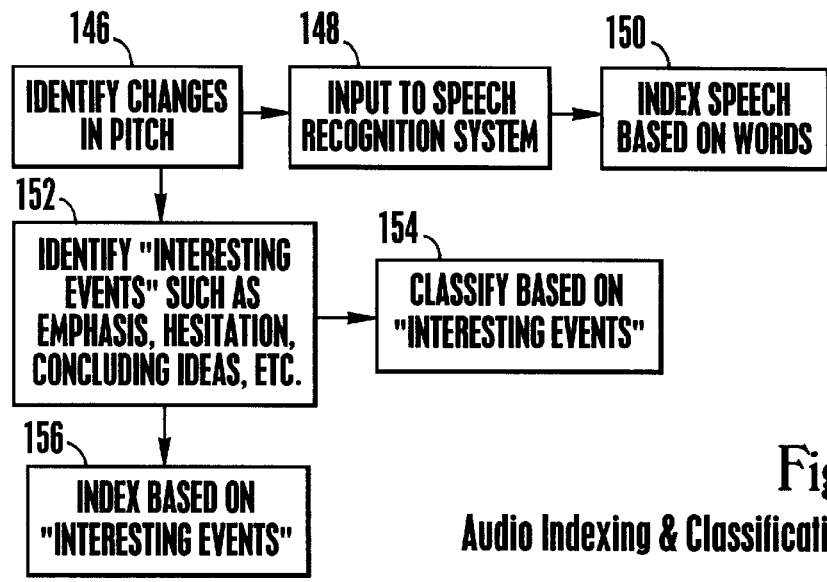
FIG. 12 is a flow chart showing the logic for further classification and indexing of an audio stream based on words and on "interesting events" in the audio.
Figure 13:
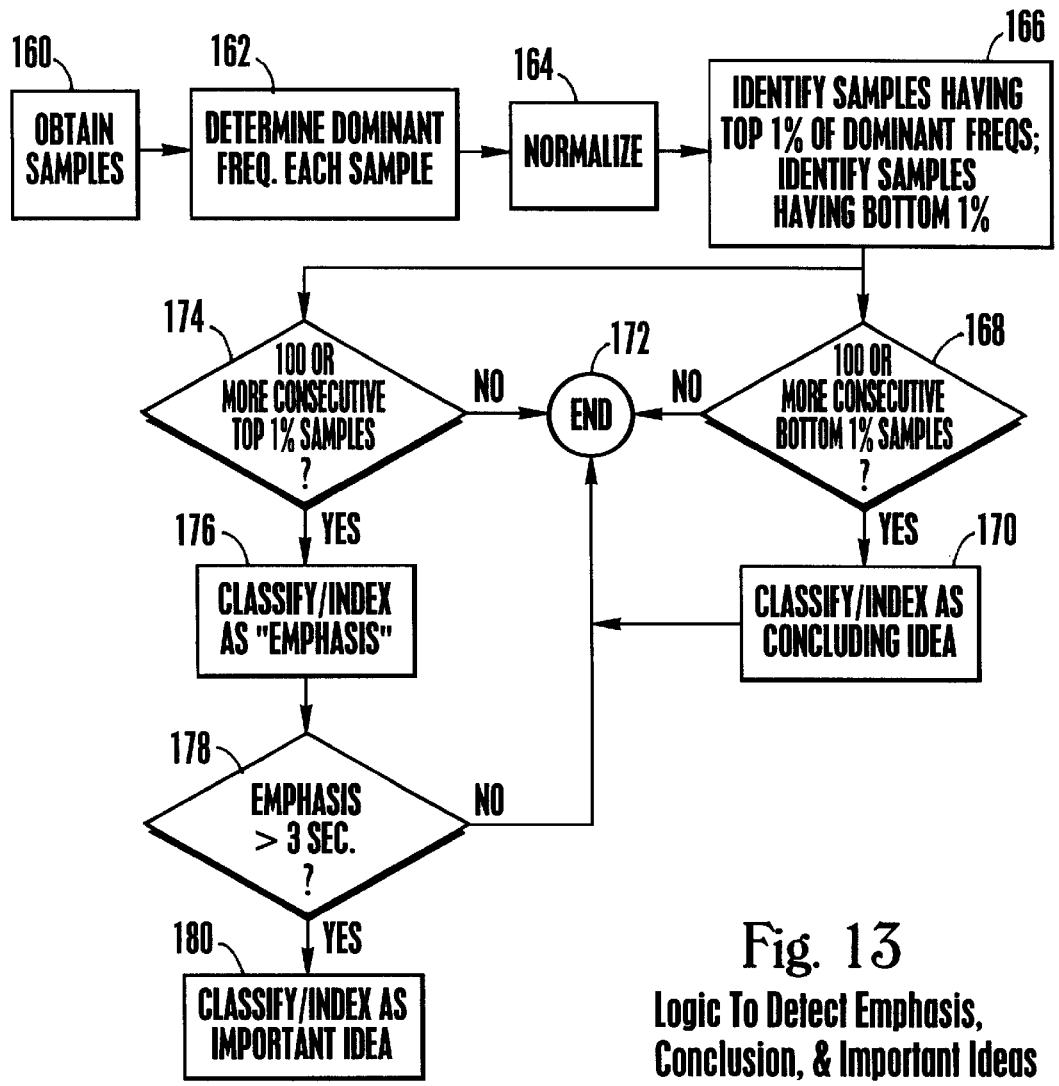
FIG. 13 is a flow chart showing the logic for determining whether samples of speech represent emphasis in speech, concluding ideas in speech, and important ideas in speech.

In addition to the above-disclosed methods for indexing audio streams, FIGS. 12 and 13 show that additional methods can be used to index the audio, and specifically by heuristically-defined "interesting events" in audio events that have been classified as "speech". Commencing at block 146 in FIG. 12, changes in pitch in an audio stream having speech therein are detected. Following the first logical branch, the method moves to block 148 to input the speech to a speech recognition system such as that disclosed in U.S. Pat. No. 5,293,584, owned by the same assignee as the present invention and incorporated herein by reference. Proceeding to block 150, the output of the speech recognition system—words—is used to index the audio stream.

In addition to indexing the audio stream by word content at block 150, the logic from block 146 follows a second branch to block 152, wherein "interesting events" in speech are identified as further discussed below in reference to FIG. 13. What constitutes "interesting events" in speech, and the tests for "interesting events", are heuristically determined. As indicated in FIG. 12, "interesting events" can include emphasis in speech, hesitation in speech, and concluding ideas in speech.

Moving to block 154, the audio stream, when it contains speech, is further indexed by meta patterns established by a sequence of "interesting event" intervals. An example of such a meta pattern is the below-described interesting event meta pattern of "important idea", which is established by a three second (or more) sequence of emphasis intervals. And, at block 156 the audio stream can also be indexed based on the individual "interesting events" therein.

Now referring to FIG. 13, a method for determining the presence of three preferred "interesting events"/meta patterns thereof is shown. Commencing at block 160, samples of the audio stream are obtained. In one preferred embodiment, each sample has a ten millisecond (10 ms) duration.

Proceeding to block 162, the dominant frequency of each sample is determined. In determining the dominant frequency, the presently preferred embodiment considers the following eight frequency bands:

| R1 — 100 Hz to 3,000 Hz | R2 — 3,000 Hz to 4,000 Hz | R3 — 4,000 Hz to 5,000 Hz |
|---|---|---|
| R4 — 5,000 Hz to 6,000 Hz | R5 — 6,000 Hz to 6,500 Hz | R6 — 6,500 Hz to 7,000 Hz |
| R7 — 7,000 Hz to 7,500 Hz | R8 — 7,500 Hz to 8,000 Hz | |

For each sample, the dominant frequency is calculated as follows:

$R_n$Freq=number of frequencies in $n^{th}$ band, n=1 to 8, divided by the total number of samples, with the dominant frequency range being defined as the largest one of the (eight) values for $R_n$Freq.

Moving to block 164, the dominant frequencies are normalized by a histogram. Having determined and normalized the dominant frequencies of the audio stream samples, the process moves to block 166 to identify samples having dominant frequencies in the top 1% of frequencies, and further to identify samples having dominant frequencies in the bottom 1% of frequencies.

Branching first to decision diamond 168, the logic determines whether any sequence in the audio stream contains one hundred or more consecutive samples having dominant frequencies in the bottom 1%. It is to be understood that shorter or longer periods can be used. If such a sequence is found, the logic proceeds to block 170 to classify and index the sequence as a concluding idea in speech, before ending at state 172. Otherwise, the logic in the decision diamond 168 branch ends at state 172.

Additionally, the logic branches to decision diamond 174, wherein the logic determines whether any sequence in the audio stream contains one hundred or more consecutive samples having dominant frequencies in the top 1%. It is to be understood that shorter or longer periods can be used. If such a sequence is found, the logic proceeds to block 176 to classify and index the sequence as emphasis in speech, before ending at state 172. Otherwise, the logic in the decision diamond 174 branch ends at state 172.

As shown in FIG. 13, when an emphasis in speech sequence is found, the logic proceeds from block 176 to decision diamond 178, wherein it is determined whether the emphasis sequence is at least three seconds in duration. Shorter or longer durations can be used, however. If such a prolonged emphasis sequence is found, the logic classifies and indexes the sequence as an important idea in speech at block 180. From block 180, or from decision diamond 178 when the test there is negative, the logic ends at state 172.

It is to be understood that the present heuristics for determining interesting events in speech can further include considering rate of change of pitch, amplitude, and rate of change of amplitude, as well as other voice characteristics.

Figure 14:
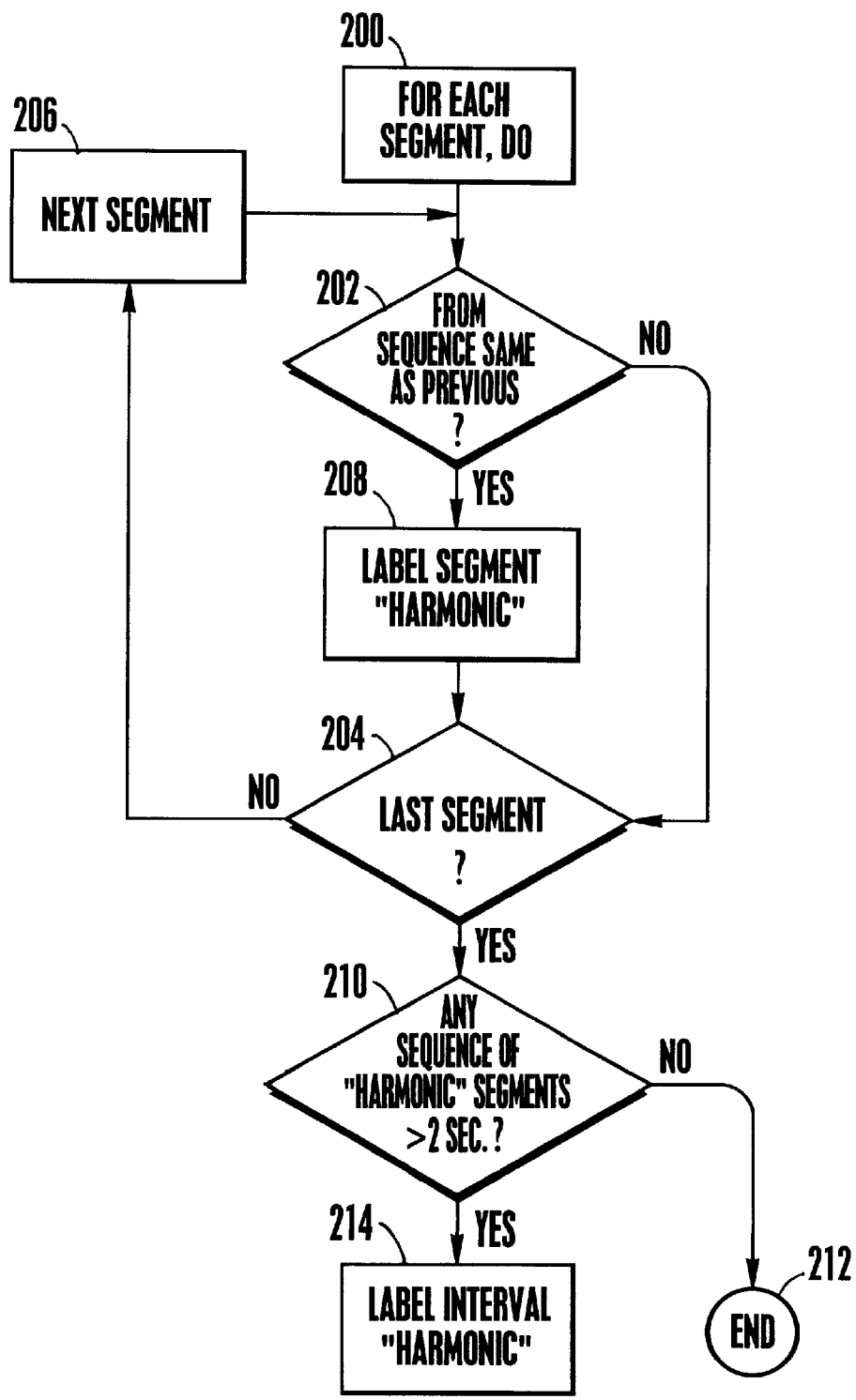
FIG. 14 is a flow chart of the logic for determining whether harmonics are present.

FIG. 14 shows the logic for determining whether an interval is "harmonic", preferably for use in the above-described test of FIG. 6. Commencing at block 200, a "DO" loop is entered for each segment in an interval. Moving to decision diamond 202, it is determined whether a sequence of resulting frequencies $f_R$ is the same as the sequence of resulting frequencies $f_R$ for the immediately preceding segment.

With respect to the resulting frequency $f_R$, as recognized by the present invention, a frequency $f_1$ has at least one musically harmonic frequency $f_2$ if the following relation holds true: $f_2=(I/(I+1))*f_1$, wherein I is an integer $\geq 2$. When both $f_1$ and $f_2$ are present simultaneously, the resulting frequency $f_R$ is present and given by the relation $f_R=f_1/I$. It is this resulting frequency $f_R$ that is used in the test at decision diamond 202.

If the test at decision diamond 202 is negative, the logic moves to decision diamond 204 to determine whether the last segment has been tested, and if not, the logic retrieves the next segment at block 206, and then loops back to decision diamond 202. On the other hand, when the test at decision diamond 202 is positive, the logic proceeds to block 208, to label the segment under test as "harmonic".

When the last segment has been tested, the logic proceeds from decision diamond 204 to decision diamond 210. At decision diamond 210, it is determined whether any sequence of "harmonic" segments is at least equal to a predetermined period, e.g., two seconds. If not, the logic ends at state 212. Otherwise, the interval is labelled as "harmonic" at block 214, for use in, e.g., the test of FIG. 6.

While the particular SYSTEM AND METHOD FOR AUTOMATIC AUDIO CONTENT ANALYSIS FOR WORD SPOTTING, INDEXING, CLASSIFICATION AND RETRIEVAL as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims.

We claim:

1. A computer-implemented method for analyzing an audio signal, comprising:
   detecting audio events in one or more intervals of the audio signal, each interval including a temporal sequence of one or more segments;
   indexing the audio signal based on the audio events; and
   skimming, gisting, or summarizing the audio signal using the indexing thereof.

2. The method of claim 1, further comprising:
   processing only relevant portions of the audio signal using a speech recognition engine to render words from the signal;
   receiving, from the engine, alternatives to at least some of the words;
   receiving, from the engine, confidence levels for at least some of the words and alternatives; and
   indexing the words and alternatives based at least in part on the confidence levels.

3. The method of claim 2, wherein alternatives are received only for words longer than "N" characters and having a confidence of greater than "x" percent.

4. The method of claim 3, wherein the words and alternatives are indexed based on respective weights.

5. The method of claim 1, further comprising heuristically defining the audio events.

6. The method of claim 1, wherein the detecting step comprises:
   determining whether the segments of an interval exhibit one or more predetermined audio features, each audio feature being representative of at least one respective audio event, the audio events including at least music and speech;
   classifying the intervals by associating the intervals with respective audio events in response to the means for determining;
   determining whether at least one group of intervals matches a meta pattern in a predefined set of meta patterns; and
   associating the group of intervals with a meta pattern classification when it is determined that the group of intervals matches a meta pattern, wherein the indexing of the audio signal is undertaken based on the interval classification and the meta pattern classification.

7. The method of claim 6, wherein each predetermined audio feature is based on one or more of: zero crossing rate of at least a portion of the audio signal, energy of at least a portion of the audio signal, spectral energy concentration of at least a portion of the audio signal, and frequency of at least a portion of the audio signal.

8. The method of claim 6, wherein the predefined set of audio events further comprises silence, speech on music, emphasis in speech, hesitation in speech, and concluding ideas in speech.

9. The method of claim 6, further comprising:
   normalizing the segments, prior to the classifying step.

10. The method of claim 6, wherein the step of determining whether the segments of an interval exhibit one or more predetermined audio features further includes:
    determining, for each segment in an interval, whether one or more audio features associated with the segment equals a respective threshold;
    incrementing respective one or more counters associated with the one or more audio features when the respective features equal respective thresholds; and
    comparing the one or more counters to the number of segments in the interval, the logic means for classifying the intervals undertaking the classifying of intervals based on the comparing step.

11. The method of claim 10, further comprising:
    determining one or more dominant frequencies in at least one interval classified as speech during the step of classifying the intervals;
    associating one or more segments with emphasis in speech when the one or more segments includes a top N% of the dominant frequencies, wherein N is a number; and
    associating one or more segments with concluding ideas in speech when the one or more segments includes a bottom N% of the dominant frequencies, wherein N is a number.

12. The method of claim 11, further comprising determining whether temporally sequential segments, all associated with emphasis in speech, define a period greater than a predetermined period, and if so, defining and indexing the temporally sequential segments as an important idea in speech.

13. A computer-implemented method for analyzing an audio signal, comprising:
   detecting audio events in one or more intervals of the audio signal, each interval including a temporal sequence of one or more segments;
   analyzing the audio events to identify speech boundaries with associated speech confidence levels;
   indexing the audio signal based on the speech boundaries and confidence levels using heuristically determined rules to improve precision;
   indexing alternatives to at least one recognized word in the audio signal along with an associated weight to improve recall; and
   undertaking one or more of: word spotting, summarizing, and skimming, the audio signal using the indexing thereof.

14. A computer including a data storage device including a computer usable medium having computer usable code means for classifying and indexing at least one audio signal representing an audio event, the computer usable code means having:
   logic means for rendering the audio signal into intervals, each interval including one or more segments;
   logic means for determining whether the segments of an interval exhibit one or more predetermined audio features, each audio feature being representative of at least one respective audio event; logic means for classifying the intervals by associating the intervals with respective audio events in response to the means for determining;
   logic means for determining whether at least one group of intervals matches a meta pattern in a predefined set of meta patterns;
   logic means for associating the group of intervals with a meta pattern classification when it is determined that the group of intervals matches a meta pattern; and
   logic means for indexing the audio signal based on interval classifications and meta pattern classifications.

15. The computer of claim 14, further comprising:
   logic means for processing only relevant portions of the audio signal using a speech recognition engine to render words from the signal;
   logic means for receiving, from the engine, alternatives to at least some of the words;
   logic means for receiving, from the engine, confidence levels for at least some of the words and alternatives; and
   logic means for indexing the words and alternatives based at least in part on the confidence levels.

16. The computer of claim 15, wherein alternatives are received only for words longer than "N" characters and having a confidence of greater than "x" percent.

17. The computer of claim 16, wherein the words and alternatives are indexed based on respective weights.

18. The computer of claim 14, wherein each predetermined audio feature is based on one or more of: zero crossing rate of at least a portion of the audio signal, energy of at least a portion of the audio signal, spectral energy concentration of at least a portion of the audio signal; and frequency.

19. The computer of claim 14, wherein the predefined set of audio events comprises music, speech, silence, and speech on music.

20. The computer of claim 14, further comprising:
   logic means for normalizing the segments, prior to classifying the intervals.

21. The computer of claim 19, wherein the predefined set of patterns includes continuous uninterrupted speech, and music combined with speech, the predefined set of patterns being heuristically defined.

22. The computer of claim 19, further comprising logic means for presenting at least portions of the intervals and meta pattern classifications for skimming, gisting, and summarizing the audio signal, using the indexing of the signal.

23. The computer of claim 14, wherein the logic means for determining whether the segments of an interval exhibit one or more predetermined audio features includes:
   means for determining, for each segment in an interval, whether one or more audio features associated with the segment equals a respective threshold;
   means for incrementing respective one or more counters associated with the one or more audio features when the respective features equal respective thresholds; and
   means for comparing the one or more counters to the number of segments in the interval, the logic means for classifying the intervals undertaking the classifying of intervals based on the means for comparing.

24. The computer of claim 14, wherein the predefined set of audio event meta pqH further includes emphasis in speech, hesitation in speech, and concluding ideas in speech, such that the logic means for indexing can index the audio signal based thereon.

25. The computer of claim 24, further comprising:
   means for determining one or more dominant frequencies in at least one interval classified as speech by the logic means for classifying the intervals;
   means for associating one or more segments with emphasis in speech when the one or more segments includes a top N% of the dominant frequencies, wherein N is a number; and
   means for associating one or more segments with concluding ideas in speech when the one or more segments includes a bottom N% of the dominant frequencies, wherein N is a number.

26. The computer of claim 25, further comprising means for determining whether temporally sequential segments, all associated with emphasis in speech, define a period greater than a predetermined period, and if so, indexing the temporally sequential segments as an important idea in speech.

27. A computer program product comprising:
   a computer program storage device readable by a digital processing apparatus; and
   a program means on the program storage device and including program code elements embodying instructions executable by the digital processing apparatus for performing method steps for indexing at least one audio signal, the method steps comprising:
      rendering the audio signal into intervals, each interval including one or more segments;
      determining whether the segments of an interval exhibit one or more predetermined audio features selected from a set of features including zero crossing rate of at least a portion of the audio signal, energy of at least a portion of the audio signal, frequency of at least a portion of the audio signal, and spectral energy concentration of at least a portion of the audio signal, each audio feature being representative of at least one respective audio event including at least music and speech;

classifying the intervals by associating the intervals with respective audio events in response to the determining step; and indexing the audio signal based at least in part on the interval classification.

28. The computer program product of claim 27, wherein the method steps further comprise:

processing only relevant portions of the audio signal using a speech recognition engine to render words from the signal;

receiving, from the engine, alternatives to at least some of the words;

receiving, from the engine, confidence levels for at least some of the words and alternatives; and indexing the words and alternatives based at least in part on the confidence levels.

29. The computer program product of claim 28, wherein alternatives are received only for words longer than "N" characters and having a confidence of greater than "x" percent.

30. The computer program product of claim 29, wherein the words and alternatives are indexed based on respective weights.

31. The computer program product of claim 27, wherein the method steps further comprise:

determining whether at least one group of intervals matches a meta pattern in a predefined set of meta patterns; and associating the group of intervals with a meta pattern classification when it is determined that the group of intervals matches a meta pattern, the indexing of the audio signal being based at least in part on the meta pattern matching.

32. The computer program product of claim 31, wherein the predefined set of audio events further comprises silence, speech on music, emphasis in speech, hesitation in speech, and concluding ideas in speech.

33. The computer program product of claim 31, wherein the method steps further comprise:

normalizing the segments, prior to the classifying step.

34. The computer program product of claim 31, wherein the method steps further include:

determining, for each segment in an interval, whether one or more audio features associated with the segment equals a respective threshold;

incrementing respective one or more counters associated with the one or more audio features when the respective features equal respective thresholds; and comparing the one or more counters to the number of segments in the interval, the logic means for classifying the intervals undertaking the classifying of intervals based on the means for comparing.

35. The computer program product of claim 34, wherein the method steps further comprise:

determining one or more dominant frequencies in at least one interval classified as speech during the step of classifying the intervals;

associating one or more segments with emphasis in speech when the one or more segments includes a top N% of the dominant frequencies, wherein N is a number; and associating one or more segments with concluding ideas in speech when the one or more segments includes a bottom N% of the dominant frequencies, wherein N is a number.

36. The computer program product of claim 35, wherein the method steps further comprise determining whether temporally sequential segments, all associated with emphasis in speech, define a period greater than a predetermined period, and if so, defining and indexing the temporally sequential segments as an important idea in speech.

* * * * *